(12) United States Patent
Brennan et al.

(10) Patent No.: US 8,571,724 B2
(45) Date of Patent: Oct. 29, 2013

(54) METHOD AND DEVICE FOR PROVIDING INFORMATION ABOUT A USER OF A SOCIAL NETWORK IN THE SOCIAL NETWORK

(75) Inventors: Ronan Brennan, San Francisco, CA (US); Markus Strassberger, Wartenberg (DE); Benjamin Weyl, Munich (DE); Mariano Herrero, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/427,156

(22) Filed: Mar. 22, 2012

(65) Prior Publication Data

US 2012/0197463 A1     Aug. 2, 2012

Related U.S. Application Data

(63) Continuation of application No. PCT/EP2010/062093, filed on Aug. 19, 2010.

(30) Foreign Application Priority Data

Sep. 23, 2009  (DE) .......................... 10 2009 042 664

(51) Int. Cl.
*G05D 1/00* (2006.01)
(52) U.S. Cl.
USPC ............................... 701/1; 701/439; 455/517
(58) Field of Classification Search
USPC ........... 701/439, 1, 31.4; 455/456.1, 517, 457
See application file for complete search history.

(56) References Cited

U.S. PATENT DOCUMENTS

| | | | |
|---|---|---|---|
| 7,480,550 B2 * | 1/2009 | Huber et al. ................. | 701/31.4 |
| 8,014,943 B2 * | 9/2011 | Jakobson ....................... | 701/439 |
| 2004/0054428 A1 | 3/2004 | Sheha et al. | |
| 2009/0093258 A1 | 4/2009 | Teng | |

FOREIGN PATENT DOCUMENTS

| | | |
|---|---|---|
| DE | 10 2008 033 642 A1 | 4/2009 |
| WO | WO 2007/079417 A2 | 7/2007 |
| WO | WO 2009/023701 A2 | 2/2009 |
| WO | WO 2009/043020 A2 | 4/2009 |

OTHER PUBLICATIONS

International Preliminary Report on Patentability dated Apr. 3, 2012 (Nine (9) pages).
Rahman, Abdur Md. et al., "SenseFace: A Sensor Network Overlay for Social Networks", Instrumentation and Measurement Technology Confernece, May 5, 2009, pp. 1031-1036, IEEE, Piscataway, NJ, USA. XP031492791. German Search Report dated Oct. 4, 2010 including partial English-language translation (Nine (9) pages).
International Search Report dated Nov. 12, 2010 including English-language translation (Six (6) pages).

* cited by examiner

*Primary Examiner* — Thomas Black
*Assistant Examiner* — Luke Huynh
(74) *Attorney, Agent, or Firm* — Crowell & Moring LLP

(57) ABSTRACT

A method and device for providing information about a user of a social network in the social network are provided. In order to enable the driver of a vehicle or a passenger to communicate with an IT social network with as little distraction as possible, the information is acquired using at least one status recognition device, which is provided in a vehicle used by the user of the social network. The status recognition device delivers status information that indicates a specific status of the vehicle, a specific driving situation, and/or the status of one or more users of the vehicle.

13 Claims, 1 Drawing Sheet

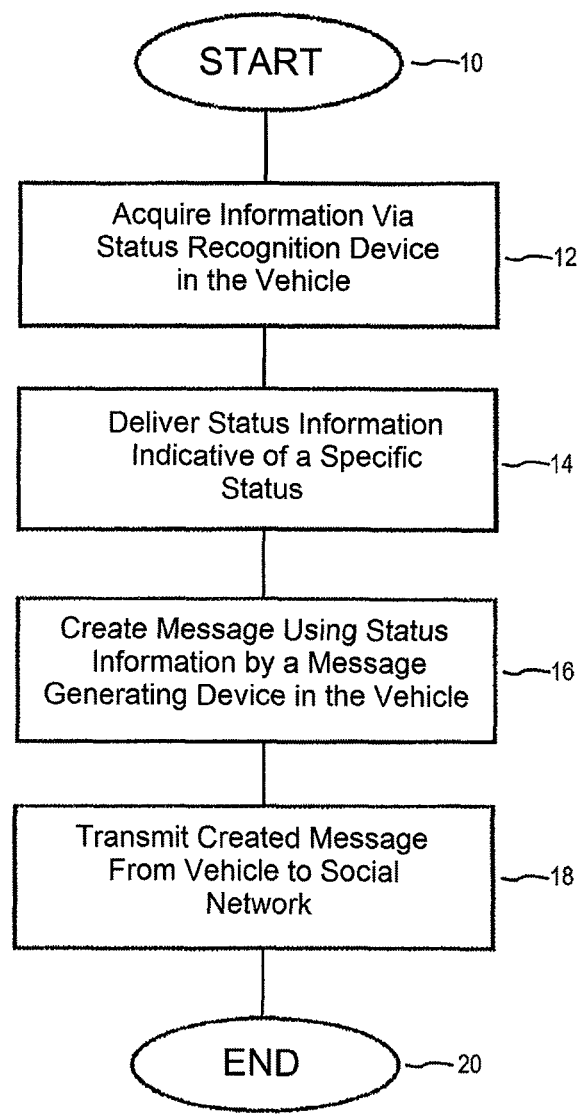

METHOD AND DEVICE FOR PROVIDING INFORMATION ABOUT A USER OF A SOCIAL NETWORK IN THE SOCIAL NETWORK

CROSS-REFERENCE TO RELATED APPLICATIONS

This application is a continuation of PCT International Application No. PCT/EP2010/062093, filed Aug. 19, 2010, which claims priority under 35 U.S.C. §119 from German Patent Application No. DE 10 2009 042 664.7, filed Sep. 23, 2009, the entire disclosures of which are herein expressly incorporated by reference.

BACKGROUND AND SUMMARY OF THE INVENTION

The invention relates, in particular, to a method for providing information about a user of a social network in the social network.

The term social network is defined below as an information technology ("IT")social network, which allows a first user to exchange information with at least one other user of the network. Examples include the social networks offered under the trademarks of Twitter, Facebook, StudiVz, XING, a so-called instant messaging platform, like the messaging platforms offering under the trademarks of MSN or Skype, a weblog, etc. An IT social network enables an electronic information exchange between the subscribers of the network. The use of mobile terminal devices, like Notebooks or mobile radio telephones, are well-known for writing and sending text messages to the social network targeted by the user.

The object of the present invention is to enable the driver of a vehicle or a passenger to communicate with an IT social network with as little distraction as possible.

This and objects are achieved according to the invention by a method for providing information about a user of a social network in the social network, wherein the information is acquired using at least one status recognition device, which is provided in a vehicle used by the user of the social network. The status recognition device delivers status information that indicates a specific status of the vehicle, a specific driving situation, and/or the status of one or more users of the vehicle.

In a preferred embodiment of the invention a message generating device for creating and transmitting a message to the social network is provided in the vehicle. The message generating device can be, for example, a device that is permanently integrated into the vehicle or also a mobile terminal device, like a laptop or a mobile telephone, that is operated in the vehicle and that communicates, in particular, with the status recognition device of the vehicle in a wireless manner, such as, in particular, via Bluetooth or WLAN. The message generating device uses the status information to create a message that matches the status information, in particular a text message, a speech message or a photo or video message that has been captured with a camera provided on the vehicle, for transmission to the social network.

In a preferred embodiment of the invention the status recognition device is designed in such a way that it recognizes the status of a vehicle roof top, in particular its open and closed state. According to the invention, the sensor unit that is present in any event in a convertible vehicle can be used to detect the position of the roof top in that the status information of the roof top is fed to the message generating device of the invention.

A preferred status recognition device according to the invention recognizes one or more of the following states: the speed of the vehicle, the geographical position of the vehicle, the road on which the vehicle is currently travelling, the vehicle's driving past a predetermined geographical position and the expected reaching of a predetermined destination. For this purpose the invention provides a navigation system that is already present in the vehicle and that is intended for guiding the driver to a target destination. The invention provides that suitable data be transmitted from the navigation system, which may be expanded, if desired, in terms of its functionality, to the inventive message generating device for the purpose of creating a commensurate message. Preferably, this feature is achieved, if necessary, by suitably expanding the software of the navigation system that is present in the vehicle in any event.

As an alternative or in addition, an additionally preferred status recognition device according to the invention recognizes the outside temperature of the vehicle and/or the actuation of the windshield wipers of the vehicle. The status information items that map these states are transmitted to the message generating device. The message generating device in turn creates the corresponding message, based on the transmitted status, for transmission to the social network, and preferably the above described states of the vehicle are treated in the same way.

Some examples of additional states that are recognized by the status recognition device and that are processed, according to the invention, into messages, can be: the roof status open/closed with respect to a convertible roof top or sliding roof, the speed of the vehicle, the kilometer/mileage reading of the vehicle, the updated current position of the vehicle, that is, in particular, the house number, place, country, road, the type of road (highway, rural road, inner city/suburb), the targeted destination and the pit stops respectively in the resolution as in the case of the updated current position, the period of time since the start of the trip, since the start of the destination guidance function, the period of time up to the targeted destination, the expected arrival time at the targeted destination, the distance from the targeted destination, the total distance driven, the distance since the last pit stop, the distance driven since the start of the destination guidance function, the temperature in the vehicle, the temperature outside the vehicle, the inside temperature set and/or requested by the driver and/or by the passenger, the heating and cooling climate control settings, such as the blower speed, the temperature (current and/or desired), the seat and/or steering wheel heating system (on/off and/or preset heating stage), the window wipers (on/off, speed), the rain sensor (intensity of the rain), the lighting internal or external (on/off), the headlights, low beam, high beam, emergency flashers, fog lights (front and/or rear), the gasoline consumption (current, first time period, second time period, average consumption), the gas tank level, the contact data of the vehicle user (name, address, optionally information about membership subscription to a social network with preferably access to the contact data present in a mobile telephone, in the vehicle or in a social network), the telephone (mobile telephone and/or a mobile telephone linked via data systems technology to the vehicle) as well as the information therein (last calls, contact names, incoming and/or outgoing calls), the type of media currently played in the vehicle (radio, CD, mp3, iPod, satellite radio), currently played soundtrack (artist, genre, title).

One embodiment of the invention provides that the transmission of the message from the vehicle to the social network does not occur until after an approval authorization by the driver, so that the approval occurs preferably by way of a corresponding manual actuation or by speech input. In so doing, the driver always has control over the information that he makes available to the social network. In addition, it can be provided that the manual actuation or the speech input allows the information to be transmitted to the social network without an additional approval authorization for a predetermined period of time or for a predetermined distance, in particular until a predetermined destination that has been entered into the navigation system is reached. A further development of the invention provides that in a first step the driver determines in a profile that he himself has executed, whether and optionally when and to whom status data about the driving mode of the vehicle shall be automatically transmitted to the social network from the vehicle without prior approval.

In one embodiment of the invention the message that is created by the message generating device and that is provided for transmission to the social network is shown visually to the driver of the vehicle or sent acoustically. In a further development of the invention the driver is offered a plurality of messages for selection and provision in the social network.

In a preferred embodiment of the invention the message that is created by the message generating device and is provided for transmission to the social network can be modified, in particular, supplemented, by the driver. Preferably, the vehicle has a blocking device that blocks a modification of or addition to the message by the driver while the vehicle is moving in order to prevent the driver from being distracted.

In a further development of the invention a plurality of messages are created by the message generating device and are provided for transmission to the social network. The driver of the vehicle selects one or more of the messages that are provided visually on a display or by way of a loudspeaker for transmission, in particular, by use of a suitable manual actuation or by speech input.

In one embodiment of the invention the corresponding manual actuation and/or the selection or the modification of the message that is provided for transmission to the social network is (are) performed by way of a rotary pushbutton, preferably a so-called "iDrive" controller that is built into the current vehicles of the assignee. In the case of the use of a rotary pushbutton, to which preference is given, a letter is selected by rotating, and the selected letter is entered onto a display by pressing the pushbutton.

The social networks within the scope of the invention are, for example, the currently well-known networks offered under the trademarks Twitter, Facebook, StudiVz, XING, a so-called instant messaging platform, like the messaging platforms offering under the trademarks of MSN or Skype, or a weblog, with which the vehicle and/or the driver communicates (communicate), according to the invention, preferably via an Internet access provided in the vehicle. It is self-evident that it can be provided that, in addition, other networks correspond with a vehicle using the method according to the invention. Similarly, it can be provided that the communication between the network and the vehicle takes place by SMS, MMS or by e-mail.

Furthermore, the invention provides a device for providing information about a user of a social network in the social network, wherein this device is integrated into a motor vehicle and carries out the method according to the invention.

Finally, the invention makes it possible to provide a vehicle with an inventive device that is intended for providing information about a user of a social network in the social network and that carries out the method according to the invention.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a flowchart illustrating a method for providing information about a user of a social network in the social network in an exemplary embodiment according to the invention.

DETAILED DESCRIPTION OF THE DRAWING

Referring to FIG. 1, according to an exemplary embodiment, after starting S10, the method acquires information via a status recognition device provided in a vehicle used by a user of the social network S12. The status recognition device then delivers the status information indicative of a specific status, such as a specific status of the vehicle, a specific driving situation, and/or a status of one or more users of the vehicle S14. A message generating device provided in the vehicle uses the delivered status information to create a message, in particular a text message, that matches the status information S16. The message generating device in the vehicle transmits the created message from the vehicle to a social network S18 before the method ends S20.

In a first example, the message generating device creates the following message that is provided for transmission to a social network:

"Just leaving Munich for Frankfurt. The distance is 380 km and I ought to arrive at 7:20 p.m."

In order to create this message, the following status data and/or the status information items are used that are provided by a navigation system (status recognition device) that is a part of the vehicle of the user of the social network and into which the destination of the trip has already been entered by the driver. The status information and/or the status data that are determined subject to the use of a GPS system of the navigation system include: the place of departure, the distance from the target destination and the expected time of arrival at the destination.

In a second example, the message generating device creates the following message:

"I am driving on the A5 at 160 km/h."

In order to create this message, the following status data and/or the status information items are used that are provided by the navigation system (status recognition device) of the vehicle of the user of the social network. The status information and/or the status data that are determined subject to the use of the GPS system of the navigation system include: the road on which the vehicle is currently driving and the speed of the vehicle.

In the third example, the message generating device creates the following message:

"Driving in my MINI convertible for 3 hours with the sunroof closed—it is raining."

In order to create this message, the status of the convertible roof top that is determined by a convertible roof top sensor of the vehicle is used. The inventive convertible roof top sensor or, more specifically, the corresponding status recognition device, determines the states of the convertible roof top: open or closed as well as the time duration of the one or other uninterrupted state. Furthermore, the invention uses the (uninterrupted) operating period of the vehicle that is determined by a corresponding vehicle operating sensor and/or by a corresponding status recognition device, in order to create the message. Finally, a rain sensor that may be present in any event in the vehicle and/or the operation of the windshield wipers is (are) used by a corresponding status recognition device in order to create the message.

In a fourth example, the message generating creates the following message:

"The tips of the MINImalism Analyzer have helped me to reduce my fuel consumption by 2 liters during the last 100 km."

The MINImalism Analyzer is an auxiliary device that is offered by the assignee in order to give the driver visual or acoustic suggestions, as a function of the specific driving situation, for reducing the fuel consumption when his vehicle is running. In order to generate the message, the corresponding status recognition device determines that the Analyzer is active, whether the Analyzer's suggestions have been followed by the driver and the amount of fuel that is saved by this suggestion as compared to the fuel consumption with the prior driving style—rounded up to a distance of 100 km.

In a fifth example, the message generating device creates the following message:

"Am currently driving past your house."

In order to create this message, the following status data and/or the status information items that are provided by the navigation system (status recognition device) of the vehicle of the user of the social network are used. The status information and/or the status data that are determined subject to the use of the GPS system of the navigation system include: the house number and the road on which the vehicle is currently driving, and the address data in an electronic address book of the driver, all of which the status recognition device compares with the current position of the vehicle and, optionally, the speed of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing information about a user of a social network in the social network, the method comprising the acts of:
    acquiring the information with at least one status recognition device operatively arranged in a vehicle that is used by the user of the social network;
    delivering, by the status recognition device, status information indicative of at least one of: a specific status of the vehicle, a specific driving situation, and a status of one or more users of the vehicle;
    creating, by way of a message generating device operatively arranged in the vehicle, a message using the status information, said message matching the status information; and
    transmitting, by way of the message generating device, the created message to the social network.

2. The method according to claim 1, wherein the created message is modifiable by the user of the vehicle.

3. The method according to claim 1, wherein the created message is a text message.

4. The method according to claim 1, wherein the act of transmitting the message from the vehicle to the social network only occurs after an approval authorization by the user of the vehicle.

5. The method according to claim 4, wherein the approval authorization occurs via a corresponding manual actuation or a speech input by the user of the vehicle.

6. The method according to claim 1, further comprising the act of visually displaying the created message to the user of the vehicle.

7. The method according to claim 6, wherein the created message is modifiable by the user of the vehicle by way of at least one controller in the vehicle.

8. The method according to claim 7, wherein a plurality of messages are created by the message generating device and provided for transmission to the social network, the user of the vehicle selecting one or more of the plurality of messages for transmission via a manual actuation or a speech input actuation.

9. The method according to claim 8, wherein the corresponding manual actuation, the selection of one or more of the provided messages, and the modification of the created message is performed via a rotary pushbutton, wherein a letter is selected via rotation and the selected letter is entered onto a display by pushing the rotary pushbutton.

10. The method according to claim 1, further comprising the acts of:
    recognizing, by the status recognition device, at least one of the following pieces of status information:
        an open or closed state of a vehicle roof top;
        a speed of the vehicle;
        a geographical position of the vehicle;
        a road on which the vehicle is currently travelling;
        a vehicle's driving past a predetermined geographical position;
        an expected reaching of a predetermined destination;
        an outside temperature of the vehicle; and
        an actuation of windshield wipers of the vehicle; and
    said status recognition device providing the status information to the message generating device for creating a corresponding message, based on the provided status information, for transmission to the social network.

11. The method according to claim 1, wherein a plurality of messages are created by the message generating device and provided for transmission to the social network, the user of the vehicle selecting one or more of the plurality of messages for transmission via a manual actuation or a speech input actuation.

12. A device for providing information about a user of a social network in the social network, the device comprising:
    a status recognition device operatively arranged in a vehicle used by the user of the social network;
    a message generative device operatively arranged in the vehicle; and
    wherein the status recognition device acquires the information and delivers status information indicative of at least one of a specific status of the vehicle, a specific driving situation of the vehicle, and a user status of the vehicle; and
    wherein the message generating device uses the status information to create a text message matching the status information for transmission to the social network.

13. A vehicle, comprising:
    a device operatively arranged in the vehicle for providing information about a user of a social network in the social network, the device comprising:
    (a) a status recognition device operatively arranged in the vehicle used by the user of the social network;
    (b) a message generative device operatively arranged in the vehicle; and
    wherein the status recognition device acquires the information and delivers status information indicative of at least one of a specific status of the vehicle, a specific driving situation of the vehicle, and a user status of the vehicle; and wherein the message generating device uses the status information to create a text message matching the status information for transmission to the social network.

\* \* \* \* \*